United States Patent
La Fetra

(10) Patent No.: US 8,589,670 B2
(45) Date of Patent: Nov. 19, 2013

(54) ADJUSTING SYSTEM CONFIGURATION FOR INCREASED RELIABILITY BASED ON MARGIN

(75) Inventor: Ross V. La Fetra, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 610 days.

(21) Appl. No.: 12/413,147

(22) Filed: Mar. 27, 2009

(65) Prior Publication Data
US 2010/0250915 A1  Sep. 30, 2010

(51) Int. Cl.
*G06F 9/00* (2006.01)
*G06F 15/177* (2006.01)
*G06F 9/24* (2006.01)
*G06F 13/00* (2006.01)

(52) U.S. Cl.
USPC .................... 713/100; 713/1; 713/2; 711/167

(58) Field of Classification Search
None
See application file for complete search history.

(56) References Cited

U.S. PATENT DOCUMENTS

| | | | |
|---|---|---|---|
| 6,668,357 B2 * | 12/2003 | Masleid | 326/83 |
| 7,257,723 B2 * | 8/2007 | Galles | 713/321 |
| 7,317,754 B1 * | 1/2008 | Remy et al. | 375/222 |
| 7,336,749 B2 * | 2/2008 | Garlepp | 375/355 |
| 2008/0205609 A1 * | 8/2008 | Zhou | 379/93.08 |
| 2009/0129505 A1 * | 5/2009 | Ware et al. | 375/316 |

* cited by examiner

*Primary Examiner* — Ji H Bae
(74) *Attorney, Agent, or Firm* — Abel Law Group, LLP

(57) ABSTRACT

A system provides a mechanism for increasing reliability by allowing margins to be evaluated and if one or more margins of a current configuration are too small, system configuration is modified to increase the margin. A computing device determines through training a first operating point of at least one operational characteristic of the system and a first margin associated therewith. The first margin is compared to a predetermined threshold margin and if the first margin is less than the predetermined threshold margin, the configuration of the system is adjusted to provide a configuration with greater margin for the operational characteristic. The system is retrained with the new configuration to determine a second operating point and a second margin associated therewith and compares the second margin to the threshold margin to determine if the second margin is more than the threshold margin, to satisfy reliability requirements.

20 Claims, 3 Drawing Sheets

ADJUSTING SYSTEM CONFIGURATION FOR INCREASED RELIABILITY BASED ON MARGIN

BACKGROUND

1. Field of the Invention

This invention relates to computer systems and more particularly to enhancing reliability in computer systems.

2. Description of the Related Art

As transfer speeds and other functionality in computer systems increase in speed, reliability may be implicated. Many hardware and software solutions have been utilized to address reliability issues. For example, systems use parity and/or cyclic redundancy checks to detect errors, and utilize retries when errors are detected. Improving reliability is a continuing goal for computing systems.

One aspect of reliability is the margin of various settings of the system. Margin is a measure of how much change is available to the particular setting before a failure in the system occurs. Typically, as system speeds goes up, margin goes down. Thus, as speeds in computer systems increase, reliability, for which margin is an indicator, can be adversely affected.

SUMMARY

Accordingly, in order to provide a mechanism for increasing reliability, a computer system allows margins to be evaluated and if one or more margins of a current configuration are below a threshold margin, the system configuration is modified to increase the margin.

In one embodiment a method is provided that includes determining, through training, a first operating point of at least one operational characteristic of a computer system and a first margin associated therewith. The first margin is compared to a predetermined threshold margin and if the first margin is less than the predetermined threshold margin, the configuration of the computer system is adjusted. The configuration adjustment may relate to such aspects of the system as speed of a bus transfer, or other aspect of the system.

The method may further include, after the configuration has been adjusted, retraining the operational characteristic of the system with the adjusted configuration to obtain a second operating point of the operational characteristic and an associated second margin. The system then compares the second margin to the threshold margin and adjusts system configuration again if the second margin is less than the threshold margin. The operational characteristic and the first operating point may be a voltage reference level associated with a communication link used to determine a one or zero value of a transmitted bit. The operational characteristic and the first operating point may be a timing associated with reads and writes on a communication link.

In another embodiment, a computer program product is provided that includes computer readable storage media storing machine-executable instructions, which when executed by a computer system, cause the computer system, responsive to a determination of a first operating point of at least one operational characteristic of a computer system and a first margin associated therewith, to compare the first margin to a predetermined threshold margin and if the first margin is less than the predetermined threshold margin, cause an adjustment of a configuration of the computer system.

In another embodiment, a computer system is operable to determine a first operating point of an operational characteristic of the computer system and an associated first margin. The computer system compares the first margin to a predetermined threshold margin and if the first margin is less than the predetermined threshold margin, adjusts a configuration of the computer system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
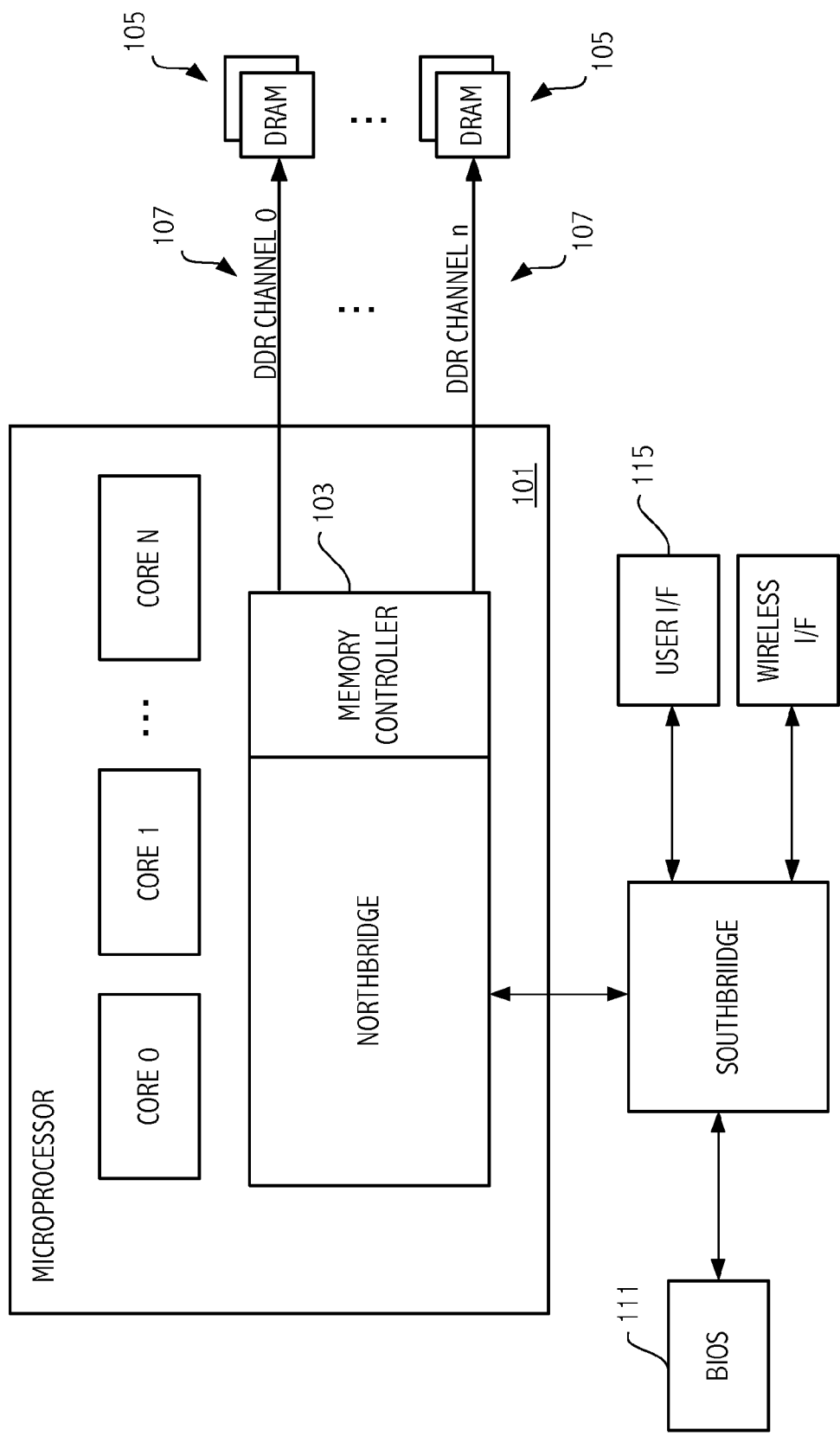
FIG. 1 illustrates a computer system according to an embodiment of the present invention.

Referring to FIG. 1, a high level block diagram of a computer system that can be operated according to an embodiment of the present invention is illustrated. The computer system includes a memory controller 103 that communicates with double data rate (DDR) synchronous dynamic random access memory (SDRAM) devices 105 via communication links 107. In order to operate the DDR channels at high speed, it is necessary to determine the appropriate operating parameters of the communication link at the particular desired transfer speed. The parameters may include write and read timing parameters associated with the transmit and receive circuitry and voltage reference levels that determine the voltage at which a "1" and a "0" is recognized. The training is accomplished by writing to the DRAM 105 with the parameters set at particular values and then reading from the DRAM 105 and comparing the write and read values to see if the transfer was successful with the particular parameters. If the read data and write data are the same, then the parameters performed satisfactorily.

Figure 2:
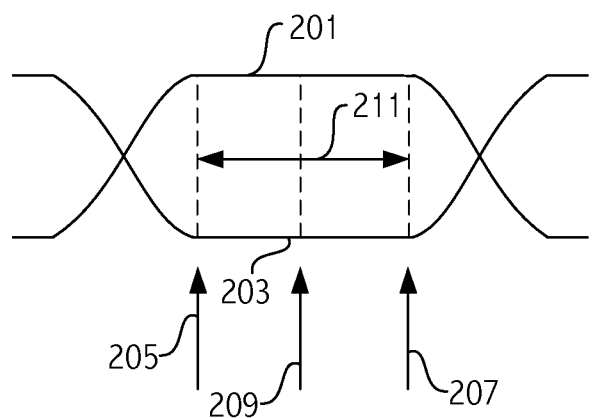
FIG. 2 illustrates an idealized eye diagram illustrating the concept of margins.
Figure 3:
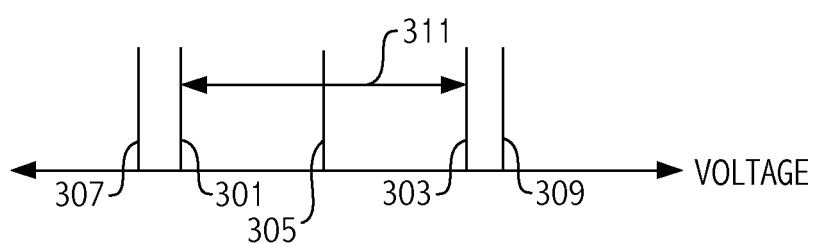
FIG. 3 illustrates a margin associated with a voltage parameter.

Typically, the training identifies a plurality of parameter values which perform satisfactorily. Thus, the training identifies a window of successful operation. Referring to FIG. 2, illustrated is an idealized eye diagram that may be associated with timing parameters within the system. An eye diagram, idealized in FIG. 2, shows superimposed transmitted data on a communication link. The top of the eye 201 represents the transmitted 1s and the bottom of the eye 203 represents transmitted 0s. When the sampling point for the data moves towards the edge of the eye at 205 or 207, the likelihood of an error increases. A sample point at 209 in the middle of the eye gives the maximum margin 211. After training, the middle parameter is chosen to provide maximum margin. Similarly, for voltage levels, as shown in FIG. 3, the minimum voltage 301 and the maximum voltage 303 provide the limits of successful operation. However, the maximum margin 311 is obtained by choosing the voltage level at 305. The voltage levels at 307 and 309 are assumed to have resulted in errors. By trying to utilize parameters with maximum margin, the system is less susceptible to voltage variations, temperature changes, aging, manufacturing variations and other factors that may affect system operation.

Thus, training identifies limits of operation along with operating points within the limits. While the system attempts to operate with the greatest margin, as system operating speeds continue to increase, margins are decreased. Thus, systems may become more susceptible to changes in voltage, temperature variations, aging, and other factors that affect system operation as system speeds increase and margins decrease. To the extent that margin is an indicator of reliability, decreasing margin can adversely affect reliability.

In order to provide a mechanism for increasing reliability, a computer system according to an embodiment of the invention allows margins to be evaluated and if margins of parameters of a current configuration are unacceptable, the configuration is modified to increase the margins.

Figure 4:
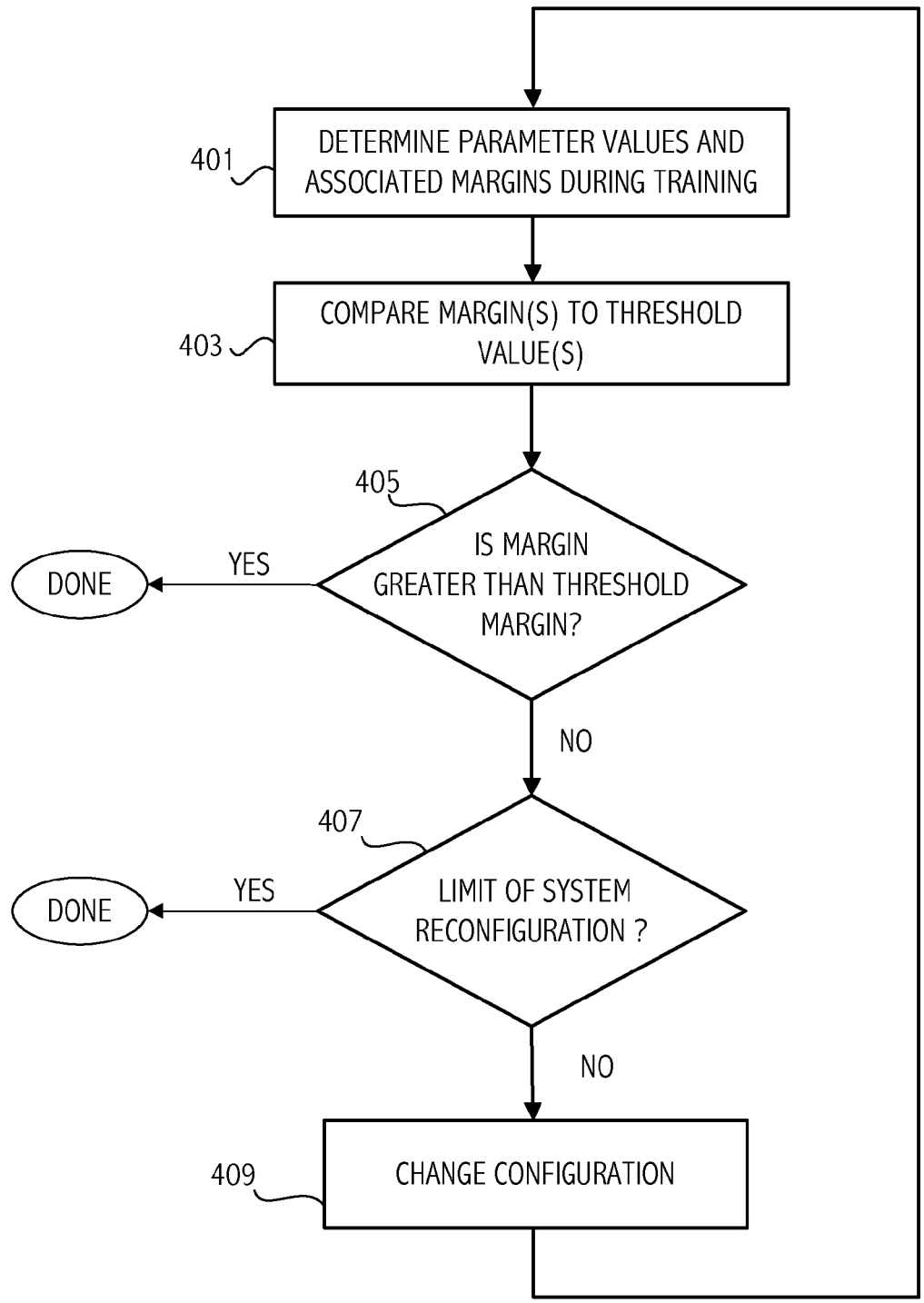
FIG. 4 illustrates a flow diagram of an embodiment of the invention.

Referring to FIG. 4, the flow diagram illustrates operation of an embodiment of the invention. In 401, an operating point of at least one operational characteristic of a computer system is determined during training along with parameter values that indicate the limits of operation and margins associated with the operating point. For example, assume the training is for one or more timing parameters associated with a communication channel. During training, multiple values of the timing parameter(s) are determined which result in successful transfers. Referring back to FIG. 2, two of those timing parameters, 205 and 207, define the timing limits at which transmissions are successful. The middle measurement 209 has the greatest distance from either edge 205 and 207 and a margin of 211 and is selected as the operating point.

Once one or more operating points, such as read timing, write timing, and/or reference voltage, and their associated margins have been determined during training, in 403 each of the margins associated with a particular operating point is compared to a threshold margin corresponding to the operating point. For the operating points related to voltage, the margins and the threshold margins may be specified in appropriate fractions of volts or as a percentage. For margins associated with timing parameters, the margins are expressed, e.g., in appropriate fractions of seconds or as a percentage.

For a particular operating point, if the margin associated with it is greater than the threshold margin in 405, then the configuration of the computer system is maintained and the process for that operational characteristic is complete. The process may then be repeated for each operational characteristic or parameter of interest. If on the other hand, the margin associated with the particular operating point is less than the threshold margin, and assuming the limit of system reconfiguration is not reached in 407, then the configuration of the system is changed in 409 to get larger margins. For an operational characteristic associated with memory subsystems, that may entail reducing the transfer speed of the memory communication link. Once the transfer speed is lowered, the system returns to 401 and the system is retrained. A slower transfer speed can result in greater timing margins. If suitably larger margins are not obtained, the transfer speed can continue to be reduced until acceptable margins are obtained during retraining, or a predetermined system limit of reconfiguration, i.e., a minimum transfer speed is reached in 407. That prevents the system from becoming unacceptably slow if a suitable margin cannot be reached.

In an embodiment, the user may be notified if the system cannot achieve a suitable margin. Similarly, the system may notify the user that the configuration has been changed to achieve the threshold margin desired and the particulars of the change in configuration.

The predetermined threshold margins may be stored in BIOS (or other) software. In an embodiment, the predetermined threshold margins are programmable through a user interface 115 (see FIG. 1). Thus, default threshold margins can be altered in such an embodiment. The system can be programmed to ensure that all threshold margins are met or in certain embodiments, only threshold margins for certain parameters may be specified. That can be accomplished by setting the threshold margins to a sufficiently low level, e.g., zero. In addition, the minimum limits for system reconfiguration may be specified as defaults in the software. For example, a minimum speed for memory transfers on a DDR channel may be included. In embodiments, that limit may be programmable as well.

The process described in FIGS. 1-4 may be implemented in software such as BIOS stored in nonvolatile memory 111 (see FIG. 1). Alternatively, software may be stored in other nonvolatile portions of a computer system, loaded into volatile memory and executed. Thus, embodiments of the present invention may include features or processes embodied within machine-executable instructions provided by a machine-readable medium such as nonvolatile memory. Such a medium may include any mechanism which stores data in a form accessible by a machine such as a microprocessor or, more generally, a computer system. A machine readable medium may include volatile and/or non-volatile memory, such as read only memory (ROM); random access memory (RAM); magnetic disk storage media; optical storage media; flash memory devices; tape, or other magnetic, optical or electronic storage medium. Such stored instructions can be used to cause a general or special purpose processor, programmed with the instructions, to perform processes of the present invention.

Note that some of the processes of the present invention may include hardware operating in response to programmed instructions. Thus, the training and system reconfiguration occurs responsive to execution of BIOS or other code. Alternatively, processes of the present invention may be performed by specific hardware components containing hard-wired logic such as state machines to perform operations or by any combination of programmed data processing components and hardware components. Thus, embodiments of the present invention may include software, data processing hardware, data processing system-implemented methods, and various processing operations, as described herein.

Thus, various embodiments have been described. Note that the description of the invention set forth herein is illustrative, and is not intended to limit the scope of the invention as set forth in the following claims. For example, while margins related to DDR DRAMS were discussed, the approach to provide adjustable margins is applicable to various settings in the system where margins exist, such as communications interfaces, including both wired or wireless. Further, the computer system described herein may be a desktop computer, a server, a laptop, a personal digital assistant (PDA), a communications device, or any other device including a processor and configurable parameters having margins that can be improved by varying an aspect of the system configuration. Variations and modifications of the embodiments disclosed herein may be made based on the description set forth herein, without departing from the scope of the invention as set forth in the following claims.

What is claimed is:
1. A method comprising:
  determining through training a first operating point of at least one operational characteristic of a computer system and a first margin associated therewith;

comparing the first margin to a predetermined threshold margin and if the first margin is less than the predetermined threshold margin, adjusting a configuration of the computer system;

retraining the operational characteristic of the system with the adjusted configuration to obtain a second operating point of the operational characteristic and an associated second margin;

comparing the second margin to the threshold margin; and adjusting system configuration again if the second margin is less than the threshold margin unless a limit for system reconfiguration has been reached.

2. The method as recited in claim 1 further comprising determining first parameter values indicative of first limits of operation of the operational characteristic, the first margin being with respect to the first limits of operation.

3. The method as recited in claim 1 wherein the adjusted configuration is slower speed transfers on one or more memory communication links.

4. The method as recited in claim 1 wherein the operational characteristic is a timing parameter associated with one of a write and read operation on a communication link.

5. The method as recited in claim 1 wherein the operational characteristic is a voltage reference level associated with a communication link, the voltage reference level used to determine a one or zero value of a transmitted bit.

6. The method as recited in claim 1 further comprising selecting the threshold margin through a user interface of the computer system.

7. The method as recited in claim 1 wherein the threshold margin is programmable.

8. The method as recited in claim 1 further comprising providing an indication to a user of the computer system when a reconfiguration has occurred to achieve an acceptable margin.

9. The method as recited in claim 1 further comprising adjusting timing of a data sampling point with respect to the first margin.

10. The method as recited in claim 1 wherein the limit for system configuration is a minimum speed for memory transfers.

11. The method as recited in claim 1 further comprising specifying threshold margins for only certain parameters including the one operational characteristic and setting respective threshold margins for other parameters equal to zero.

12. A computer program product comprising one or more non-transitory computer readable storage media storing machine-executable instructions, which when executed by a computer system, cause the computer system to:

responsive to a determination of a first operating point of at least one operational characteristic of the computer system and a first margin associated therewith, compare the first margin to a predetermined threshold margin and if the first margin is less than the predetermined threshold margin, cause an adjustment of a configuration of the computer system;

train the operational characteristic of the computer system with the adjusted configuration to obtain a second operating point of the operational characteristic and an associated second margin;

compare the second margin to the threshold margin; and adjust system configuration again if the second margin is less than the threshold margin unless a limit for system reconfiguration has been reached.

13. The computer program product as recited in claim 12 wherein the machine-executable instructions further cause the computer system to be responsive to a user interface of the computer system to set the threshold margin.

14. The computer program product as recited in claim 12 wherein the machine-executable instructions further cause the computer system to provide an indication to a user of the computer system when a reconfiguration has occurred to achieve an acceptable margin.

15. The computer program product as recited in claim 12 wherein the machine-executable instructions, when executed by a computer system, cause the computer system to:

determine through training the first operating point of the at least one operational characteristic and the first margin associated therewith.

16. A computer system comprising:

one or more processors;

memory coupled to the one or more processors;

the computer system, responsive to execution of instructions stored in the memory, being operable to determine a first operating point of an operational characteristic of the computer system and an associated first margin, operable to compare the first margin to a predetermined threshold margin and if the first margin is less than the predetermined threshold margin, to adjust a configuration of the computer system, and operable to train with the adjusted configuration to provide a second operating point with a second margin and to compare the second margin to the threshold margin and adjust system configuration again if the second margin is less than the threshold margin unless a limit for system reconfiguration has been reached.

17. The computer system as recited in claim 16 wherein the computer system is further operable to determine, through training of a communication link, first parameter values indicative of first limits of operation of the first operational characteristic, the first margin being determined with respect to the first limits of operation.

18. The computer system as recited in claim 17 wherein the communication link is a memory communication link coupling memory to a memory controller.

19. The computer system as recited in claim 16 wherein the computer system is operable to reduce a transfer speed on a communication link to adjust the configuration of the computer system.

20. The computer system as recited in claim 16 wherein the threshold margin is programmable.

* * * * *

UNITED STATES PATENT AND TRADEMARK OFFICE
CERTIFICATE OF CORRECTION

PATENT NO. : 8,589,670 B2  
APPLICATION NO. : 12/413147  
DATED : November 19, 2013  
INVENTOR(S) : La Fetra Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 735 days.

Signed and Sealed this
Fifth Day of May, 2015

Michelle K. Lee
*Director of the United States Patent and Trademark Office*